(12) United States Patent
Kim

(10) Patent No.: US 11,677,067 B2
(45) Date of Patent: Jun. 13, 2023

(54) METHOD FOR MANUFACTURING ANODE OF LITHIUM-ION BATTERY AND LITHIUM-ION BATTERY INCLUDING ANODE OF LITHIUM-ION BATTERY MANUFACTURED BY THE METHOD

(71) Applicants: Hyundai Motor Company, Seoul (KR); Kia Motors Corporation, Seoul (KR)

(72) Inventor: Dong Hui Kim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 198 days.

(21) Appl. No.: 17/134,856

(22) Filed: Dec. 28, 2020

(65) Prior Publication Data

US 2021/0273218 A1    Sep. 2, 2021

(30) Foreign Application Priority Data

Feb. 28, 2020 (KR) ........................ 10-2020-0025300

(51) Int. Cl.
*H01M 4/38* (2006.01)
*H01M 10/0525* (2010.01)
(Continued)

(52) U.S. Cl.
CPC ....... *H01M 4/1399* (2013.01); *H01M 4/0404* (2013.01); *H01M 4/0471* (2013.01); *H01M 4/137* (2013.01); *H01M 4/364* (2013.01); *H01M 4/382* (2013.01); *H01M 4/604* (2013.01); *H01M 4/661* (2013.01); *H01M 10/0525* (2013.01); *H01M 2004/021* (2013.01); *H01M 2004/027* (2013.01)

(58) Field of Classification Search
CPC ............. H01M 4/0404; H01M 4/0447; H01M 4/0471; H01M 4/134; H01M 4/137; H01M 4/1395; H01M 4/1399; H01M 4/364; H01M 4/382; H01M 4/386; H01M 4/587; H01M 4/604; H01M 4/661; H01M 10/049; H01M 10/052; H01M 10/0525; H01M 2004/021; H01M 2004/027; Y02E 60/10
See application file for complete search history.

(56) References Cited

U.S. PATENT DOCUMENTS 7,192,673 B1 * 3/2007 Ikeda .................... H01M 4/386
429/66
2016/0310924 A1 * 10/2016 Nakatomi ................ B01J 13/18
(Continued)

FOREIGN PATENT DOCUMENTS

KR    10-2018-0073679 A    7/2018
KR    10-2020-0001120 A    1/2020

*Primary Examiner* — Ula C Ruddock
(74) *Attorney, Agent, or Firm* — Fox Rothschild LLP

(57) ABSTRACT

The present invention relates to a method for manufacturing an anode of a lithium-ion battery capable of controlling an expansion directionality of an anode material whose volume expands by charging, and a lithium-ion battery including the anode manufactured by the method. More specifically, the present invention provides a method capable of improving the life of a lithium-ion battery by adjusting the tensile strength of a current collector and thus controlling the expansion directionality of an anode material, which expands during charging.

5 Claims, 1 Drawing Sheet

(51) Int. Cl.
    *H01M 4/04*         (2006.01)
    *H01M 4/137*      (2010.01)
    *H01M 4/1399*     (2010.01)
    *H01M 4/66*         (2006.01)
    *H01M 4/60*         (2006.01)
    *H01M 4/36*         (2006.01)
    H01M 4/02         (2006.01)

(56) References Cited

U.S. PATENT DOCUMENTS

2019/0319254 A1* 10/2019 Tsuchida ............... H01M 4/366
2020/0036010 A1*  1/2020 Kohiki .................. H01M 4/661
2021/0399284 A1* 12/2021 Toshiro ................. H01M 4/139

* cited by examiner

METHOD FOR MANUFACTURING ANODE OF LITHIUM-ION BATTERY AND LITHIUM-ION BATTERY INCLUDING ANODE OF LITHIUM-ION BATTERY MANUFACTURED BY THE METHOD

CROSS-REFERENCE TO RELATED APPLICATION

This application claims under 35 U.S.C. § 119(a) the benefit of priority to Korean Patent Application No. 10-2020-0025300 filed on Feb. 28, 2020, the entire contents of which are incorporated herein by reference.

TECHNICAL FIELD

The present invention relates to a method for manufacturing an anode of a lithium-ion battery capable of controlling an expansion directionality of an anode material whose volume expands by charging, and a lithium-ion battery including the anode manufactured by the method. The method may improve the life of a lithium-ion battery by adjusting the tensile strength of a current collector and thus by controlling the expansion directionality of an anode material that expands during charging.

BACKGROUND

Graphite is mainly used as an anode of a commercialized lithium-ion battery, but recently, a method for using a silicone-based anode instead of graphite to increase battery capacity has been studied. However, the silicone-based anode has a problem in that the battery life is short and incomplete due to the volume expansion while charging and discharging processes are repeated. The electrode material applied to the silicone-based anode illustrates a volume expansion rate of 10 times or greater when compared to an electrode material applied to a conventional graphite anode.

Currently, research has been conducted to improve the anode material by blending the existing graphite and silicone materials to control the expansion of the silicone-based anode, or to apply a binder with enhanced adhesion. However, the solution to the expansion of the silicone-based anode has still been sought problems caused by an increase in the cost due to material development, a reduction in the manufacturing yield of the material, a complexity of manufacturing the material, and the like.

The above information disclosed in this Background section is only for enhancement of understanding of the background of the invention and accordingly it may contain information that does not form the prior art that is already known in this country to a person of ordinary skill in the art.

SUMMARY

In one preferred aspect, provided is a method of manufacturing an anode that may prevent a problem caused by the expansion of an anode material due to charging and discharging of a lithium-ion battery.

In one preferred aspect, provided is a method manufacturing an anode by controlling the expansion directionality of the anode material due to charging and discharging of a lithium-ion battery.

In one preferred aspect, provided is a method manufacturing an anode to improve the life of a lithium-ion battery including a silicone-based anode material.

The object of the present invention is not limited to the aforementioned object. The object of the present invention will be more apparent from the following description, and realized by a means described in the claims and combinations thereof.

In an aspect, provided is a method for manufacturing an anode of a lithium-ion battery, which may include preparing an electrode current collector comprising copper and an electrode slurry; applying the electrode slurry on the electrode current collector; and drying the electrode slurry and the electrode current collector. Preferably, the tensile strength of the electrode current collector may be adjusted by the drying.

The electrode slurry may include silicone.

The thickness of the electrode current collector may be about 2 μm to about 25 μm.

The electrode slurry and the electrode current collector may be dried under a vacuum atmosphere.

The tensile strength of the electrode current collector, after the drying, may be about 25 kgf/mm$^2$ or less.

The tensile strength of the electrode current collector, after the drying, may be about 15 kgf/mm$^2$ to 22 kgf/mm$^2$.

In an aspect, provided is a lithium-ion battery including an anode manufactured by the method described herein. In particular, the lithium-ion battery may include an anode; a cathode including lithium; and an electrolyte which is interposed between the cathode and the anode. The anode may include an electrode current collector including copper; and an anode material, which may be coated on the electrode current collector.

The anode material may include silicone.

The anode material in the anode may expand during charging.

The anode material may expand in a thickness direction and a surface direction.

The anode material may expand while increasing in height in the thickness direction and increasing in area in the surface direction.

The anode material may have a surface directional area increase rate (B) having about 2.5% or greater.

A ratio (A/B) of the surface directional area increase rate (B) and a thickness directional height increase rate (A) of the anode material may be about 14 or less.

A ratio (A/B) of the surface directional area increase rate (B) and a thickness directional height increase rate (A) of the anode material may be about 11 or less.

The tensile strength of the electrode current collector may be about 25 kgf/mm$^2$ or less.

According to various exemplary embodiments of the present invention, the problem caused by the expansion of the anode material due to charging and discharging of the lithium-ion battery may be prevented.

According to various exemplary embodiments of the present invention, the expansion directionality of the anode material according to charging and discharging of the lithium-ion battery may be controlled.

According to various exemplary embodiments of the present invention, the life of the lithium-ion battery including the silicone-based anode material may be improved.

The effects of the present invention are not limited to the aforementioned effects. It should be understood that the effects of the present invention include all effects which may be inferred from the following description.

Other aspects of the invention are disclosed infra.

BRIEF DESCRIPTION OF THE DRAWINGS

The above and other features of the present invention will now be described in detail with reference to certain exemplary embodiments thereof illustrated in the accompanying drawings which are given herein below by way of illustration only, and thus are not limitative of the present invention, and wherein.

Figure 1:
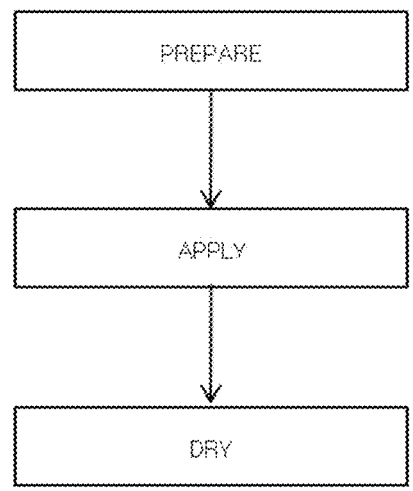
FIG. 1 shows an exemplary method for manufacturing an anode of a lithium-ion battery according to an exemplary embodiment of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, positions, and shapes will be determined in section by the particular intended application and use environment.

In the figures, reference numbers refer to the same or equivalent sections of the present invention throughout the several figures of the drawing.

DETAILED DESCRIPTION

As described above, objects, other objects, features, and advantages according to the present invention will be readily understood through the following preferred embodiments associated with the accompanying drawings. However, the present invention is not limited to the embodiments described herein and may also be embodied in other forms. Rather, the embodiments introduced herein are provided so that the invention may be made thorough and complete, and the spirit according to the present invention may be sufficiently conveyed to those skilled in the art.

In this specification, it should be understood that terms such as "comprise" or "have" are intended to indicate that there is a feature, a number, a step, an operation, a component, a part, or a combination thereof described on the specification, and do not exclude the possibility of the presence or the addition of one or more other features, numbers, steps, operations, components, parts, or combinations thereof in advance. Further, when a portion such as a layer, a film, a region, or a plate is referred to as being "above "the other portion, it may be not only "right above" the other portion, but also another portion in the middle. On the contrary, when a portion such as a layer, a film, a region, or a plate is referred to as being "under "the other portion, it may be not only "right under" the other portion, but also another portion in the middle.

Unless otherwise indicated, all numbers, values, and/or expressions referring to quantities of ingredients, reaction conditions, polymer compositions, and formulations used herein are to be understood as modified in all instances by the term "about" as such numbers are inherently approximations that are reflective of, among other things, the various uncertainties of measurement encountered in obtaining such values.

Further, unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

In the present specification, when a numerical range is disclosed for a variable, such range is continuous, and includes unless otherwise indicated, every value from the minimum value to and including the maximum value of such range. Still further, where such a range refers to integers, unless otherwise indicated, every integer from the minimum value to and including the maximum value is included.

In the present specification, when a range is described for a variable, it will be understood that the variable includes all values within the described range including the described endpoints of the range. For example, it will be understood that a range of "5 to 10" includes not only values of 5, 6, 7, 8, 9, and 10 but also any sub-range of 6 to 10, 7 to 10, 6 to 9, 7 to 9, or the like, and also includes any value between reasonable integers within the scope of the described ranges such as 5.5, 6.5, 7.5, 5.5 to 8.5, 6.5 to 9, and the like. Further, it will be understood that a range of "10% to 30%" includes, for example, not only all integers including values, such as 10%, 11%, 12%, and 13%, and 30% but also any sub-range such as 10% to 15%, 12% to 18%, 20% to 30%, or the like, and also includes any value between reasonable integers within the scope of the described range, such as 10.5%, 15.5%, and 25.5%.

It is understood that the term "vehicle" or "vehicular" or other similar term as used herein is inclusive of motor vehicles in general such as passenger automobiles including sports utility vehicles (operation SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The present invention relates to a method for manufacturing an anode of a lithium-ion battery, the anode of the lithium-ion battery manufactured by the method, and the lithium-ion battery including the anode.

Hereinafter, the present invention will be described in detail with reference to the drawings.

Method for Manufacturing an Anode of a Lithium-Ion Battery

A method for manufacturing an anode of a lithium-ion battery may include preparing an electrode current collector including copper and an electrode slurry, applying the electrode slurry on the electrode current collector, and drying the electrode slurry and the electrode current collector. Preferably, the tensile strength of the electrode current collector may be adjusted by the drying.

FIG. 1 illustrates a flowchart of a method for manufacturing an exemplary anode of a lithium-ion battery according to an exemplary embodiment of the present invention, and each step will be described based on the flowchart.

Preparing

The method includes a step of preparing electrode slurry and an electrode current collector.

The electrode slurry may be applied on the electrode current collector to form an electrode layer, and the electrode slurry may be manufactured by mixing an anode material and a solvent. The electrode slurry may further include one selected from the group consisting of a conductive material, a binder, and a combination thereof as necessary.

The anode material may include silicone.

The anode material may further include a carbon-based material such as graphite as necessary.

The conductive material may include one or more conductive materials selected from the group consisting of carbon black, fine graphite particle, natural graphite, artificial graphite, acetylene black, Ketjen black, carbon fiber, carbon nanotube, copper, nickel, aluminum, and silver.

The binder may include one selected from the group consisting of an aqueous binder, a non-aqueous binder, and a combination thereof.

The present invention does not limit the anode composition of the electrode slurry excluding the anode material particularly, and any material which may be used in the general lithium-ion battery field may be applied to the present invention.

The electrode current collector may include one selected from the group consisting of copper, stainless steel, aluminum, nickel, and titanium, and may preferably include copper.

The thickness of the electrode current collector may be, preferably about 2 µm to 25 µm. When the thickness of the electrode current collector is less than about 2 µm, the durability of the lithium-ion battery may be degraded as the current collector of the lithium-ion battery, and when the thickness of the electrode current collector is greater than about 25 µm, the electrode current collector having the tensile strength desired in the present invention may not be manufactured by drying or the like.

Applying

The method includes a step of applying the prepared electrode slurry on the electrode current collector. At this time, the present invention does not limit the method for applying particularly, and any method for applying the electrode slurry in the lithium-ion battery field may be applied to the present invention.

Drying

The method includes a step of drying the electrode slurry applied on the electrode current collector.

The drying may preferably be performed in a vacuum atmosphere.

Preferably, the solvent included in the electrode slurry may be completely removed by the drying, and an anode layer may be formed. In particular, the tensile strength of the electrode current collector may change by the drying.

The present invention does not limit a drying temperature and a drying time particularly. However, the drying is preferably performed until the electrode current collector is included in a desired range of the tensile strength by the drying.

The tensile strength of the electrode current collector may preferably be adjusted to about 25 kgf/mm$^2$ or less by the drying, or particularly be adjusted to about 15 kgf/mm$^2$ to 22 kgf/mm$^2$.

Anode of a Lithium-Ion Battery

The anode of the lithium-ion battery may include an electrode current collector containing copper and an anode material coated on the electrode current collector.

The anode material may suitably include silicone.

The electrode current collector may be attached in contact with the anode material, and as the anode material expands in the surface direction, the electrode current collector laminated with the anode material may also increase in area.

Lithium-Ion Battery

The lithium-ion battery according to the present invention includes an anode, an cathode containing lithium, and an electrolyte which is interposed between the cathode and the anode.

The electrolyte may include a polymer solid electrolyte, or include a liquid electrolyte solution composed of a solvent containing a lithium salt. A separator including an olefin-based porous film may be positioned between the cathode and the anode.

The anode may include an electrode current collector and an anode material, and the cathode material preferably contains lithium.

The cathode and the electrolyte are sufficient as long as they have a material or configuration applicable to a general lithium-ion battery, and the present invention does not limit the anode and the electrolyte particularly.

The anode is the same as the aforementioned anode lithium-ion battery, and will not be described in duplicate.

In the lithium-ion battery according to exemplary embodiments of the present invention, lithium-ions are transferred from the cathode to the anode material through the electrolyte during charging, and during discharging, energy is generated while the lithium-ions positioned within the molecular structure of the anode material return to the cathode again.

The material used for the anode material may preferably have crystallinity, and may be representatively graphite. However, the lithium-ion battery may include silicone capable of intercalation of a larger amount of lithium-ions, or a material of blending graphite and silicone.

During charging, the anode material may expand in volume due to an influence of the internal ion repulsion by the intercalation, and the anode material fixed to the electrode current collector eventually may expand in the thickness direction.

Figure 2:
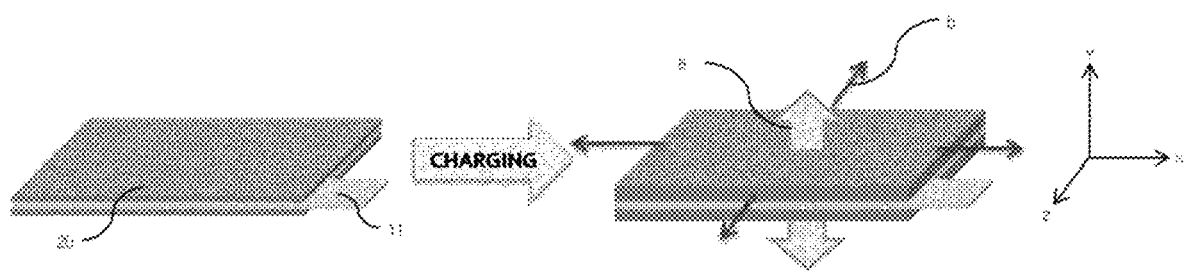
FIG. 2 shows an expansion process which is generated in the anode during charging of a lithium-ion battery applying a conventional silicone-based anode material.

FIG. 2 briefly illustrates the expansion process. For example, as charging is performed, an anode material 20 may increase in thickness in the thickness direction, i.e. in the Y-axis direction of the XYZ-axis coordinate system, and may increase in area in the surface direction, i.e. in the XZ-axis direction of the XYZ-axis coordinate system. The anode material 20 may be fixed to an electrode current collector 11 having a relatively high tensile strength (greater than about 25 kgf/mm$^2$), and the anode material 20 may not be much expanded in a surface direction (B), i.e. in the XZ axis direction due to an influence of the electrode current collector 11. When the expansion of the anode material 20 as described above is performed excessively, there may cause a problem in that the anode material 20 may be eventually separated or distorted from the electrode current collector 11.

The tensile strength of the electrode current collector 10 may be reduced to a certain level or less so that the electrode current collector 10 may be stretched in the surface direction (B) according to the expansion of the anode material 20. Preferably, the tensile strength of the electrode current collector 10 may preferably be about 25 kgf/mm² or less.

Figure 3:
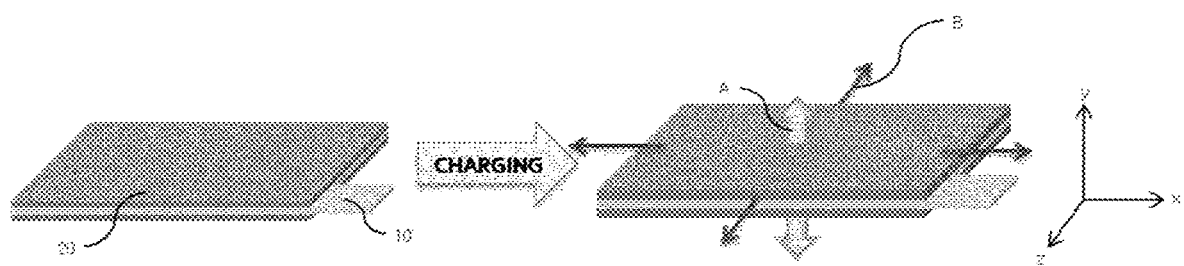
FIG. 3 shows an exemplary expansion process which is generated in an exemplary anode during charging of a lithium-ion battery, which uses an electrode current collector adjusting a tensile strength and applies an exemplary silicone-based anode material according to an exemplary embodiment of the present invention.

As shown in FIG. 3, during charging, the anode material 20 may not only increase in thickness in the thickness direction but may also increase in area in the surface direction.

When comparing FIGS. 2 and 3, the thickness directional height increase rate (a) and the surface directional area increase rate (b) of the anode material 20, which is attached on the general electrode current collector 11 having a tensile strength greater than about 25 kgf/mm² and the thickness directional height increase rate (A) and the surface directional area increase rate (B) of the anode material 20 which is attached on the electrode current collector 10 having a tensile strength of about 25 kgf/mm² or less may have the relationship as expressed by Equation 1 below.

$$a > A, B > b \quad \text{Equation 1}$$

(In Equation 1, a value refers to $(a_t-a_0/a_0)*100\%$, b value refers to $(b_t-b_0/b_0)*100\%$, A value refers to $(A_t-A_0/A_0)*100\%$, and B value refers to $(B_t-B_0/B_0)*100\%$)

Here, the $a_0$ and $A_0$ refer to the initial heights of the anode material, the $a_t$ and $A_t$ refer to the heights of the anode material after charging for t hours, the $b_0$ and $B_0$ refer to the initial widths of the anode material, and the $b_t$ and $B_t$ refer to the width of the anode material after charging for t hours.

The shape of the anode material 20 may be suppressed from being excessively deformed in the thickness direction even upon the same volume expansion, and instead, the anode material 20 may expand even in the surface direction, thereby distributing the force. Further, the anode material 20 may be prevented from being separated from the electrode current collector 10.

During charging, the anode material may increase in area in the surface direction, increase in height (thickness) in the thickness direction, or increase all in area and height in the surface direction and the thickness direction.

The anode material may have an area increase rate (B) in the surface direction having preferably about 2.5% or greater. Particularly, the anode material may have the area increase rate (B) in the surface direction having about 2.5% to 4.0%. When the area increase rate is less than about 2.5%, the expansion rate of the anode material may increase in the thickness direction after charging, and when the area increase rate is greater than about 4.0%, the anode material may be excessively expanded in the surface direction.

A ratio (A/B) of the surface directional area increase rate (B) and the thickness directional height increase rate (A) of the anode material may be about 12 or less, and may be preferably about 10 or less. More preferably, the ratio may be about 6 to 10. When the ratio is less than about 6, the anode material may be excessively expanded in the surface direction, and when the ratio is greater than about 12, the anode material may excessively expand in the thickness direction.

EXAMPLE

Hereinafter, the present invention will be described in more detail through specific embodiments. However, these embodiments are intended to illustrate the present invention and the scope of the present invention is not limited by these embodiments.

Embodiments 1 to 4, Comparative Examples 1 to 4

An anode was manufactured by drying electrode slurry and a current collector while preparing a current collector having various tensile strengths as expressed by Table 1, and applying, on the current collector, electrode slurry consisting of an active material (natural graphite:silicone alloy (MKE Co.)=90:10), a conductive material and a binder (carboxymethyl cellulose:styrene-butadiene rubber:acrylic=1:2:1), and adjusting the tensile strength of the current collector as expressed by Table 1 below. Thereafter, a lithium-ion battery was assembled by preparing a lithium salt containing 0.5M $LiPF_6$ and 0.5M LiFSI, an electrolyte containing ethyl carbonate, dimethyl carbonate, ethyl methyl carbonate, and diethyl carbonate in a ratio of 25:45:20:10, respectively, and an cathode (NCM811). At this time, the thickness of each current collector was 8 μm equally.

TABLE 1

| | Embodiment 1 | Embodiment 2 | Embodiment 3 | Embodiment 4 | Comparative Example 1 | Comparative Example 2 | Comparative Example 3 | Comparative Example 4 |
|---|---|---|---|---|---|---|---|---|
| Tensile strength (kgf/mm²) | 23.3 | 20.1 | 17.1 | 15.4 | 54.4 | 27.8 | 31.1 | 12.0 |

*Current collector - Chang Chun(HT08), Chang Chun copper foil

Experimental Example

Summaries were prepared as shown in Table 2 below by measuring the amounts of changes in the thickness and the area in the thickness direction and the surface direction after the formation charging and discharging of the lithium-ion batteries manufactured in Embodiments and Comparative Examples and the twice charging thereof. Further, the capacity of the residual battery after charging and discharging 30 times at a rate of 0.33 C was additionally expressed. 0

TABLE 2

| | Embodiment 1 | Embodiment 2 | Embodiment 3 | Embodiment 4 | Comparative Example 1 | Comparative Example 2 | Comparative Example 3 | Comparative Example 4 |
|---|---|---|---|---|---|---|---|---|
| Change in thickness directional height (%) | 25 | 22.2 | 21.0 | 20 | 38 | 30.4 | 30.1 | 16.3 |
| Change in surface directional area (%) | 2.8 | 3.1 | 3.4 | 3.6 | 1.2 | 1.8 | 1.9 | 5.0 |
| Residual capacity (%) (after 300 times) 0.33 C-rate | 74 | 75 | 76 | 76 | 65 | 69 | 68 | 75 short occurrence |

As shown in Table 2, the ratios (A/B) of the thickness directional height increase rate (A) to the surface directional area increase rate (B) in Embodiments 1 to 4 were about 5.6 to 8.9, whereas the ratios (A/B) in Comparative Examples 1 to 3 were about 15.8 to 31.7 and the thickness directional height increase rate (A) was significantly greater than the surface directional area increase rate (B).

For the case of Comparative Examples, the difference between the height increase rate and the area increase rate was large, whereas the difference between the height increase rate and the area increase rate in Embodiments was small, such that the anode material according to various exemplary embodiments of the present invention may be expected to stably expand in volume by charging and discharging.

Further, in the residual capacity after charging and discharging 300 times, the residual capacity of the lithium-ion battery in Embodiments was different by 5% or greater from the residual capacity of the lithium-ion battery in Comparative Examples, such that it may be expected that the life of the lithium-ion battery applying the current collector according to the present invention may be further improved than that of the lithium-ion battery applying the general current collector.

What is claimed is:

1. A lithium-ion battery comprising:
an anode;
a cathode comprising lithium; and
an electrolyte interposed between the cathode and the anode,
wherein the anode comprises:
an electrode current collector comprising copper; and
an anode material which is coated on the electrode current collector,
wherein the tensile strength of the electrode current collector is about 15.4 kgf/mm$^2$ to 20.1 kgf/mm$^2$; and
wherein the anode material has a surface directional area increase rate (B) of about 3.1% or greater.

2. The lithium-ion battery of claim 1, wherein the anode material comprises silicone.

3. The lithium-ion battery of claim 1, wherein the anode material in the anode expands during charging.

4. The lithium-ion battery of claim 1, wherein a ratio (A/B) of the surface directional area increase rate (B) and a thickness directional height increase rate (A) of the anode material is about 14 or less.

5. The lithium-ion battery of claim 1, wherein a ratio (A/B) of the surface directional area increase rate (B) and a thickness directional height increase rate (A) of the anode material is about 11 or less.

* * * * *